United States Patent [19]

Hutson

[11] 4,279,092
[45] Jul. 21, 1981

[54] FISHING WEIGHT

[76] Inventor: Duane Hutson, 1315 Country Club Prado, Coral Gables, Fla. 33134

[21] Appl. No.: 114,895

[22] Filed: Jan. 24, 1980

[51] Int. Cl.³ ............................................. A01K 95/00
[52] U.S. Cl. .................................... 43/44.91; 43/44.89
[58] Field of Search ................. 43/44.87, 44.89, 44.95, 43/44.93, 44.91, 44.92, 44.9

[56] References Cited

U.S. PATENT DOCUMENTS

| | | | |
|---|---|---|---|
| 1,434,335 | 10/1922 | Frost | 43/44.91 |
| 2,077,184 | 4/1937 | Rader | 43/44.87 |
| 2,722,764 | 11/1955 | Blockinger | 43/44.91 |
| 2,807,907 | 10/1957 | Brite | 43/44.91 |
| 3,808,728 | 5/1974 | Patte | 43/44.91 |

Primary Examiner—Gary L. Smith
Assistant Examiner—Robert P. Olszewski

[57] ABSTRACT

A fishing weight body having an axis which is coincident or coplanar with the fishing line on which it is used, the body of which is comprised of a material having a specific gravity substantially greater than one, said body having an axial channel containing a resilient but substantially incompressible insert such as nylon and with the body of the weight being formed with lips to retain the resilient insert and further being formed with a recess proximate the insert into which a portion of the insert may flex for quick release or insertion of the fishing line.

17 Claims, 8 Drawing Figures

FISHING WEIGHT

FIELD OF THE INVENTION

This invention relates to the field of fishing accessories, and, more particularly, to the area of fishing weights which are attached to the fishing line near the lure or bait.

BACKGROUND OF THE INVENTION

It is well known that fishing weights or sinkers are attached to fishing line to submerge the fishing lure or bait in the water so that fish will be attracted to it. In the years since monofilament fishing line has become universal, a variety of means have been used with varying success to attach said weights to the line. Crimping of weights requires a tool which frequently becomes lost or corroded. Reusability of crimped weights is limited and also requires a tool. Knots are relatively difficult to tie and ineffective. Usually such knots must be cut when it is desired to change a weight.

Therefore, various inventions have previously been directed to alternative means of attaching fishing weights and other accessories to fishing line. These include Wright, U.S. Pat. No. 3,557,486, which includes a protective coating to prevent damage to the fishing line and optionally hooks on either end thereof for attachment of the line. Another example of attachment means includes Hoyle, U.S. Pat. No. 3,192,662, which requires the weight to be fabricated from a flexible material, thereby reducing its specific gravity. Rader et al., U.S. Pat. No. 2,077,184, is actually for a fishline float and it includes split guides or loops or eyes on either end and a converging roll in a radial longitudinal slot. Radar et al., would seemingly permit movement of the device along the length of the line since there is no assurance that the fishing line would remain wedged far enough down in the converging walls of the slot.

Olsen et al., U.S. Pat. No. 3,069,802, illustrates a fishing sinker having an embedded clip which would provide for ease of attachment and detachment, but even less assurance of movement along the line than Rader et al. The closest known art is Bittaker, U.S. Pat. No. 3,293,792. Bittaker employs the concept of utilizing lead or another heavy material surrounding a resilient interior material utilized for attachment to the fishing line and removability therefrom. However, Bittaker suffers from several limitations which are overcome by the present invention. These include the fact that the core element of Bittaker must have substantial resilience resulting from compressibility in order to permit the insertion of a fishing line down through its serpentine slit, that resilience and compressibility resulting in substantially reduced gripping power of the device to maintain its position on the fishing line. The nature of resiliently compressible substances make the Bittaker core element far more subject to wear, with an even further resulting loss of gripping ability. Moreover, the construction of Bittaker makes it clear that a large quantity of core material is necessary in order to produce a serpentine slit of sufficient length to restrain the line from coming free therefrom, and of sufficient width to provide some gripping power on the line. This also necessitates a large size for the weight, making the invention of Bittaker impractical or extremely fragile in small sizes.

SUMMARY OF THE INVENTION

With the foregoing in mind, it is a principal object of the present invention to provide a quick release fishing weight which is readily attachable to fishing line.

A related object of the invention is to utilize a tough substantially incompressible, but resilient interior material with a fishing weight which is small in size to permit its use with very small weights.

A correlated object of the invention is to provide a quick release and readily attachable fishing weight which is inexpensive to manufacture and easy to use.

Another object of the invention is to permit use of a fishing weight which will not move along the fishing line, but will not require the tying of knots or crimping of the weight on the line.

A further object of the invention is to provide a fishing weight which is small in size, inexpensive to purchase, and can be readily reused numerous times without damage either to the weight or to the fishing line.

An additional object of the invention is to provide a combination fishing weight body and resilient insert structure which will permit the use of substantially incompressible material for the insert, thereby increasing its useful life.

One more object of the invention is to provide a fishing weight suitable for use with a number of different weight lines.

A further object of the invention is to provide a fishing weight which will not deteriorate upon exposure and will not require a high degree of manual dexterity for attachment to and removal from fishing line.

Still another object of the invention is to provide a fishing weight which can be attached and released from different size fishing lines repeatedly without the use of tools.

Other objects and advantages will become apparent to those skilled in the art upon reading the following descriptions of the invention and upon reference to the drawings.

In accordance with the invention, there is provided a fishing weight body having an axis which may be coplanar with fishing line, with which it is to be used, or even with an axis which is coincident with the fishing line. The body of the fishing weight will be comprised of a material having a specific gravity substantially greater than one, preferably lead or a similarly heavy metal. Formed within the body will be an axial channel containing a resilient, but substantially incompressible insert preferably comprising nylon or other material not subject to deterioration, resilient, extremely tough, which can be molded in large quantitites extremely economically. The body of the weight will be formed with lips to retain the resilient insert and will include a recessed area proximate to the insert into which a portion of the insert may flex resiliently, but incompressibly, for quick release or insertion of the fishing line. The insert, although resilient, will preferably be molded from a substantially incompressible material to substantially increase its useful life and resulting gripping ability.

The invention contemplates two types of inserts, one having an axial cavity penetrating the sole axis of the fishing weight and the other having an insert containing a radial split coplanar with the axis of the weight. Both embodiments of the invention contemplate the recess into which the insert may resiliently, but incompressibly flex for insertion and removal of the fishing line. Both embodiments also contemplate sizing of the insert and internal surfaces of the weight body such that the insert can be snapped into place by automated manufacturing equipment with a minimum of crimping, shaping, deforming, or otherwise altering the shape of the body of the weight during the assembly process.

The invention will be better understood after reading the following description of the embodiments thereof with regard to the appended drawings, in which:

DETAILED DESCRIPTION

Figure 1:
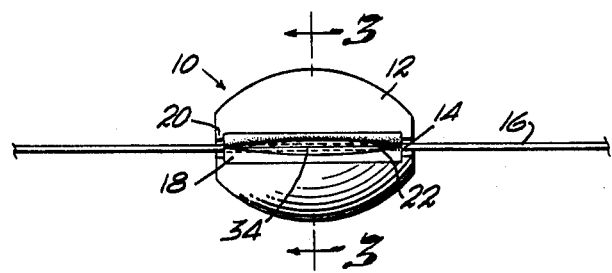
FIG. 1 is a top view of the axial cavity embodiment of the invention.

Referring now to FIG. 1, and the axial cavity embodiment of the invention, a fishing weight 10 is comprised of a body 12 having an axis 14 which is coplanar and may be coincident with fishing line 16 with which the invention is to be used. Positioned within the body 12 of the fishing weight 10 is an axial cavity insert 18 preferably formed from resilient, but substantially incompressible, moldable, tough material. A typical such material may be nylon or another hydrocarbon polymer. The insert 18 is partially held in place within the body 12 by a lip 20. The fishing line 16 is shown simply traversing the entire axis of the body 12 in FIG. 1, but it may be wrapped around the body one or more times, each time being passed through the radial aperture in the insert 18.

Figure 2:
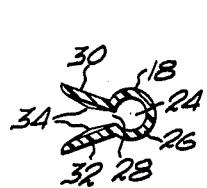
FIG. 2 is a cross sectional view of an axial cavity insert prior to placement within the body of the fishing weight during assembly of the invention.

In FIG. 2, the cross section of the insert 18 is shown prior to positioning within the body of the fishing weight. It contains an axial cavity 24 of appropriate size for the fishing weight into which it will be positioned and also an appropriate wall thickness 26 to permit it to be resiliently deformed for insertion within the body of the weight, and to allow a variety of fishing line sizes to pass therethrough. It is also afforded a radial aperture 28 between legs 30 and 32 through which fishing line 16 may be inserted and released. Legs 30 and 32 have a tapered thickness 34, with the legs being thicker at their axial ends than near the geometric center thereof. This can more clearly be seen in FIG. 1 and is useful for insertion of the fishing line, but provides reliable retention and better gripping thereof until removal is sought.

Figure 3:
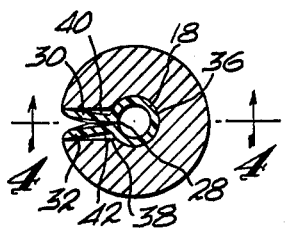
FIG. 3 is a cross sectional view taken along the line 3—3 of FIG. 1, but with the fishing line removed.
Figure 4:
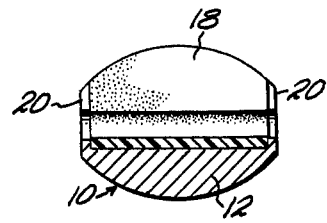
FIG. 4 is a cross sectional view taken along the line 4—4 of FIG. 3.

In FIG. 3, insert 18 is press fitted into an axial bore 36 of substantially the same or slightly smaller diameter than the outside diameter of the axial cavity wall 26. The radial aperture 28 is thereby substantially closed. Legs 30 and 32 are positioned within an axial channel 38 in a manner to leave a recess 40 and 42 between each leg 30 and 32 and the wall of the axial slot 38. This recess is to permit substantially incompressible flexing of the insert as the fishing line is inserted or released from the axial cavity 24. In FIG. 4, axial retention of the insert 18 within the body 12 of the weight 10 can be readily seen. Radial retention, of course, occurs because the outside diameter 26 of the axial cavity 24 is larger than the width of the axial slot 38, as best seen in FIG. 3.

Figure 5:
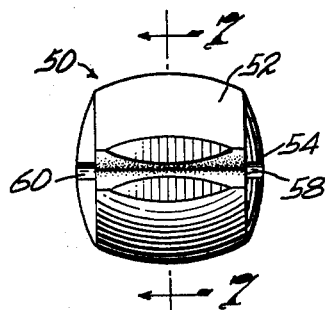
FIG. 5 is a top view of the axial slit embodiment of the invention.

Turning now to FIG. 5, and the axial slit embodiment of the invention, a fishing weight 50 is comprised of a body 52 having an axis 54 which is coplanar and may be coincident with fishing line with which the invention is to be used. Positioned within the body 52 of the fishing weight 50 is a radial slit insert 58 preferably formed from resilient, but substantially incompressible, moldable tough material. A typical such material may be nylon or another hydrocarbon polymer. The insert 58 is partially held in place within the body 52 by a lip 60. Fishing line is not shown in FIG. 5, but would pass along the axis 54, and could be wrapped around the body one or more times, each time being passed through the radial slit in the insert 58, as in the manner described with FIG. 1.

Figure 6:
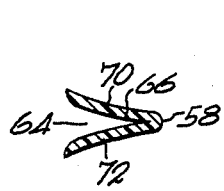
FIG. 6 is a cross sectional view of an axial slit insert prior to placement within the body of the fishing weight.

Referring to FIG. 6, the cross section of the insert 58 is shown prior to positioning within the body of the fishing weight. It contains a radial slit 64 and an appropriate wall thickness 66 to permit it to resiliently deformed for insertion within the body of the weight and to allow a variety of fishing line sizes to pass therethrough. It includes legs 70 and 72 of appropriate length to permit the insert 58 to be inserted within and retained by the body 52 with a minimum of crimping of said body 52 to flex the legs 70 and 72 of the insert 58 to hold them closely together, as best seen in FIG. 7.

Figure 7:
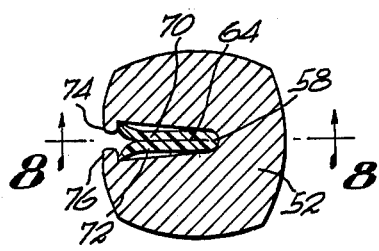
FIG. 7 is a cross sectional view of the axial slit embodiment of the invention taken along the line 7—7 of FIG. 5.

Turning to FIG. 7, the flexion of legs 70 and 72 of insert 58 presses the insides of said legs together to close radial slit 64 by the slight crimping of shoulders 74 and 76. These shoulders 74 and 76 also ensure that the insert will not come out of the body 52 of the fishing weight when a fishing line is removed from radial slit 64.

Figure 8:
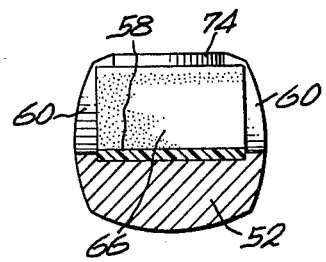
FIG. 8 is a cross sectional view of the same embodiment taken along the line 8—8 of FIG. 7.

Turning finally to FIG. 8, taken along the line 8—8 of FIG. 7, wall thickness 66 is shown next to body 52 and the radial slit insert 58 is shown held in position by lips and shoulder 74.

Having described the presently preferred embodiments of the invention, it should be understood that various changes in construction and arrangement will be apparent to those skilled in the art and are fully contemplated there with departing from the true spirit of the invention. Accordingly, there are covered all alternatives, modifications, and equivalents as may be included within the spirit and scope of the invention as defined herein solely by the appended claims.

What is claimed is:

1. A fishing weight comprising:
   a body having an axis, with a specific gravity greater than one, formed with an axial channel and connected radial slot therein;
   a resilient substantially incompressible axial cavity containing insert having legs, said insert being captured within the axial channel and radial slot of the body; and
   a substantially closed radial aperture defined by the legs of the insert, said aperture intersecting the entire length of the axial cavity of the insert, said legs being formed to provide a recess between each leg and a proximate wall of the radial slot for flexion of the legs.

2. The fishing weight of claim 1 which further comprises lips which partially terminate the channel at its extremities to axially capture the insert within the channel.

3. The fishing weight of claim 1 wherein the insert is molded from a tough, deterioration resistant water insoluble, substantially incompressible, resilient polymer.

4. The fishing weight of claim 1 wherein the insert has an axial cavity wall thickness that is appropriate to resilient deformation of the insert for placement of the insert in the channel of the body.

5. The fishing weight of claim 1 wherein at least one leg of the insert has an axially tapered thickness.

6. The fishing weight of claim 5 wherein leg thickness is greater at the axial extremities than at a geometric center thereof.

7. The fishing weight of claim 1 wherein an outside dimension of an insert axial cavity wall is greater than a width of the radial slot, thereby radially capturing the insert within the axial channel and radial slot.

8. The fishing weight of claim 1 wherein an outside dimension of an insert axial cavity wall is slightly greater than an inside dimension of the axial channel, thereby effecting a press fit of the insert within the body.

9. A fishing weight comprising:
a body having an axis, with a specific gravity greater than one formed with a radial slot and connected axial channel therein, said channel partially terminated at its axial extremities with lips;
a resilient substantially incompressible axial cavity containing insert having legs said insert being captured, radially within the axial channel by an outside dimension greater than width of the radial slot, and being captured axially by the lips; and
a substantially closed radial aperture defined by the legs of the insert, said aperture intersecting the entire length of the axial cavity of the insert, said legs being formed to provide a recess each leg and a proximate wall of the radial slot for flexion of the legs.

10. A fishing weight comprising:
a body having an axis, with a specific gravity greater than one and formed with a slot therein parallel to the axis;
a resilient substantially incompressible insert having legs, said insert being captured within the slot of the body; and
a substantially closed radial slit defined by the legs of the insert, said legs being formed to provide a recess between each leg and a proximate wall of the slot for flexion of the legs.

11. The fishing weight of claim 10 which further comprises lips which partially terminate the slot at its extremities to axially capture the insert within the slot.

12. The fishing weight of claim 10 wherein the insert is molded from a tough, deterioration resistant water insoluble, substantially incompressible, resilient polymer.

13. The fishing weight of claim 10 which further comprises at least one shoulder in the slot to radially capture the insert therein.

14. The fishing weight of claim 13 wherein the shoulder impinges on at least one leg to flex same, thereby pressing the legs together.

15. The fishing weight of claim 10 wherein at least one leg of the insert has an axially tapered thickness.

16. The fishing weight of claim 15 wherein leg thickness is greater at the axial extremities than at geometric center thereof.

17. A fishing weight comprising:
a body having an axis, with a specific gravity greater than one and formed with a slot therein parallel to the axis, said slot partially terminated at its axial extremities with lips, and having at least one shoulder in the slot;
a resilient substantially incompressible insert having legs said insert being captured within the slot radially by the shoulder and axially by the lips; and
a substantially closed radial slit defined by the legs of the insert, said legs being pressed together by the impingement of a least one leg, and said legs being formed to provide a recess between each leg and a proximate wall of the slot for flexion of the legs.

* * * * *